US010891814B2

(12) United States Patent
Briskey (10) Patent No.: US 10,891,814 B2
(45) Date of Patent: Jan. 12, 2021

(54) MOBILE CREDENTIAL MANAGEMENT SYSTEM FOR VEHICLE KEY BOX ACCESS CONTROL

(71) Applicant: Carrier Corporation, Palm Beach Gardens, FL (US)

(72) Inventor: Teri Lynne Briskey, Monmouth, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/176,300

(22) Filed: Oct. 31, 2018

(65) Prior Publication Data

US 2019/0139337 A1 May 9, 2019

Related U.S. Application Data

(60) Provisional application No. 62/582,371, filed on Nov. 7, 2017.

(51) Int. Cl.
*G07C 9/27* (2020.01)
*G07C 9/20* (2020.01)
(Continued)

(52) U.S. Cl.
CPC ......... *G07C 9/215* (2020.01); *G07C 9/00309* (2013.01); *G07C 9/00896* (2013.01);
(Continued)

(58) Field of Classification Search
None
See application file for complete search history.

(56) References Cited

U.S. PATENT DOCUMENTS

| 5,635,693 A | 6/1997 | Benson et al. |
| 5,705,991 A | 1/1998 | Kniffin et al. |

(Continued)

FOREIGN PATENT DOCUMENTS

WO 2016201355 A1 12/2016

OTHER PUBLICATIONS

EP Application No. 18204636.7 Extended EP Search Report dated Apr. 3, 2019, 8 pages.
(Continued)

*Primary Examiner* — K. Wong
(74) *Attorney, Agent, or Firm* — Cantor Colburn LLP (57) ABSTRACT

A mobile credential management system includes a processing system and a memory system with computer-executable instructions that, when executed by the processing system, cause the processing system to perform a plurality of operations. The operations include issuing a credential to a mobile device operable to trigger opening of a releasable latch of a vehicle key box responsive to receiving the credential within an assigned window of time. The operations also include monitoring for a releasable latch opened indicator from the vehicle key box indicative of the vehicle key box acknowledging the credential and providing access to a vehicle key corresponding to a vehicle assigned to the vehicle key box. The operations further include sending a notification to a user system responsive to receiving the releasable latch opened indicator, the notification identifying the vehicle and information about a user of the mobile device.

20 Claims, 5 Drawing Sheets

(51) Int. Cl.
*G07C 9/00* (2020.01)
*G07C 9/28* (2020.01)
*H04W 12/06* (2009.01)
*G07F 17/00* (2006.01)

(52) U.S. Cl.
CPC .......... *G07C 9/00912* (2013.01); *G07C 9/27* (2020.01); *G07C 9/28* (2020.01); *H04W 12/06* (2013.01); *G07F 17/0057* (2013.01)

(56) References Cited

U.S. PATENT DOCUMENTS

| | | | |
|---|---|---|---|
| 7,042,334 B2 | 5/2006 | Mosgrove et al. | |
| 7,061,367 B2 | 6/2006 | Mosgrove et al. | |
| 7,123,127 B2* | 10/2006 | Mosgrove | B60R 25/23 340/5.21 |
| 7,606,558 B2* | 10/2009 | Despain | G07C 9/00023 455/410 |
| 7,880,584 B2* | 2/2011 | Larson | G07C 9/00103 340/5.2 |
| 7,949,541 B2* | 5/2011 | McGinn | G06Q 30/02 705/1.1 |
| 8,040,218 B2 | 10/2011 | Hays et al. | |
| 8,451,088 B2 | 5/2013 | Fisher | |
| 8,606,589 B2 | 12/2013 | McGinn et al. | |
| 8,635,462 B2 | 1/2014 | Ullmann | |
| 8,665,062 B2 | 3/2014 | Bragagnini et al. | |
| 8,744,925 B2 | 6/2014 | Seergy et al. | |
| 8,797,138 B2 | 8/2014 | Myers et al. | |
| 9,053,629 B2 | 6/2015 | Fisher et al. | |
| 9,208,456 B2 | 12/2015 | McGinn et al. | |
| 9,514,482 B2 | 12/2016 | Wilson | |
| 9,704,315 B2 | 7/2017 | Fisher et al. | |
| 2009/0153291 A1 | 6/2009 | Larson et al. | |
| 2009/0313121 A1 | 12/2009 | Post et al. | |
| 2011/0099036 A1 | 4/2011 | Sarkissian et al. | |
| 2011/0215897 A1 | 9/2011 | Simpson et al. | |
| 2011/0313937 A1 | 12/2011 | Moore, Jr. et al. | |
| 2014/0266594 A1 | 9/2014 | Reiser | |
| 2014/0344014 A1 | 11/2014 | Macinnis | |
| 2017/0103597 A1 | 4/2017 | Fisher | |

OTHER PUBLICATIONS

Digital Dealer, The Future of Car Buying is Mobile, retrieved from the internet: https://www.digitaldealer.com/future-car-buying-mobile/, Sep. 17, 2017, 4 pages.
EP Application No. 18204636.7 Office Action dated Aug. 13, 2020, 6 pages.

* cited by examiner

MOBILE CREDENTIAL MANAGEMENT SYSTEM FOR VEHICLE KEY BOX ACCESS CONTROL

CROSS-REFERENCE TO RELATED APPLICATION

This application claims the benefit of priority to U.S. Provisional Application No. 62/582,371 filed Nov. 7, 2017, the disclosure of which is incorporated herein by reference in its entirety.

BACKGROUND

The present disclosure relates to a lock system with mobile device access, and more particularly, to a mobile credential management system for vehicle key box access control.

Traditionally, lock boxes and similar devices are operated manually by a user to gain access to a key that unlocks an independent lock. Such lock boxes require the user to know a combination to gain access to the key. Unfortunately, such lock box use creates a cumbersome process and often scenarios where security may be in question.

In certain situations, such as in vehicle sales, a potential customer may desire access to the interior of a locked vehicle for closer inspection when a salesperson is not physically present. The vehicle may have a key stored within a lockbox, but without a capability for the user to open the lockbox, the user must still wait for a salesperson to arrive to gain entry into the vehicle interior.

BRIEF DESCRIPTION

According to an embodiment, a mobile credential management system includes a processing system and a memory system with computer-executable instructions that, when executed by the processing system, cause the processing system to perform a plurality of operations. The operations include issuing a credential to a mobile device operable to trigger opening of a releasable latch of a vehicle key box responsive to receiving the credential within an assigned window of time, monitoring for a releasable latch opened indicator from the vehicle key box indicative of the vehicle key box acknowledging the credential and providing access to a vehicle key corresponding to a vehicle assigned to the vehicle key box, and sending a notification to a user system responsive to receiving the releasable latch opened indicator. The notification identifies the vehicle and information about a user of the mobile device.

In addition to one or more of the features described above or below, or as an alternative, further embodiments may include where the credential is issued in response to a scheduling request identifying the vehicle and the assigned window of time.

In addition to one or more of the features described above or below, or as an alternative, further embodiments may include sending a verification message with a link to access the credential responsive to the scheduling request.

In addition to one or more of the features described above or below, or as an alternative, further embodiments may include transferring the credential to the mobile device responsive to activation of the link.

In addition to one or more of the features described above or below, or as an alternative, further embodiments may include disabling access to open the releasable latch of the vehicle key box using the credential after the assigned window of time.

In addition to one or more of the features described above or below, or as an alternative, further embodiments may include gathering the information about the user of the mobile device during creation of a scheduling request, and linking an identifier of the user to the credential.

In addition to one or more of the features described above or below, or as an alternative, further embodiments may include revoking the credential responsive to an administrative request prior to opening of the releasable latch using the credential.

According to another embodiment, a vehicle key access control system includes a vehicle key box and a mobile credential management system. The vehicle key box includes a lockable key repository configured to hold a vehicle key corresponding to a vehicle assigned to the vehicle key box, an access panel with a releasable latch, and a controller operable to unlock the releasable latch responsive to receiving a credential from a mobile device within an assigned window of time and output a releasable latch opened indicator acknowledging the credential. The mobile credential management system includes a processing system operable to issue the credential to the mobile device, monitor for the releasable latch opened indicator, and send a notification to a user system responsive to receiving the releasable latch opened indicator, the notification identifying the vehicle and information about a user of the mobile device.

In addition to one or more of the features described above or below, or as an alternative, further embodiments may include where the lockable key repository includes a key presence device adapted to detect return of the vehicle key, and the controller is operable to notify the user system of a key return event responsive to the key presence device.

In addition to one or more of the features described above or below, or as an alternative, further embodiments may include where the lockable key repository is lined with a radio frequency obstructing material.

In addition to one or more of the features described above or below, or as an alternative, further embodiments may include where the credential is issued in response to a scheduling request identifying the vehicle and the assigned window of time, and the processing system is operable to send a verification message with a link to access the credential responsive to the scheduling request and transfer the credential to the mobile device responsive to activation of the link.

In addition to one or more of the features described above or below, or as an alternative, further embodiments may include where use of the credential is disabled after the assigned window of time.

In addition to one or more of the features described above or below, or as an alternative, further embodiments may include where the processing system is operable to gather the information about the user of the mobile device during creation of a scheduling request and link an identifier of the user to the credential.

In addition to one or more of the features described above or below, or as an alternative, further embodiments may include where the credential is revoked responsive to an administrative request prior to opening of the releasable latch using the credential.

According to another embodiment, a method of mobile credential management includes issuing, by a mobile credential management system, a credential to a mobile device operable to trigger opening of a releasable latch of a vehicle key box responsive to receiving the credential within an assigned window of time. The mobile credential management system monitors for a releasable latch opened indicator from the vehicle key box indicative of the vehicle key box acknowledging the credential and providing access to a vehicle key corresponding to a vehicle assigned to the vehicle key box. The mobile credential management system sends a notification to a user system responsive to receiving the releasable latch opened indicator, the notification identifying the vehicle and information about a user of the mobile device.

Technical effects of embodiments of the present disclosure include controlling access to a lockbox through a mobile device credential.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
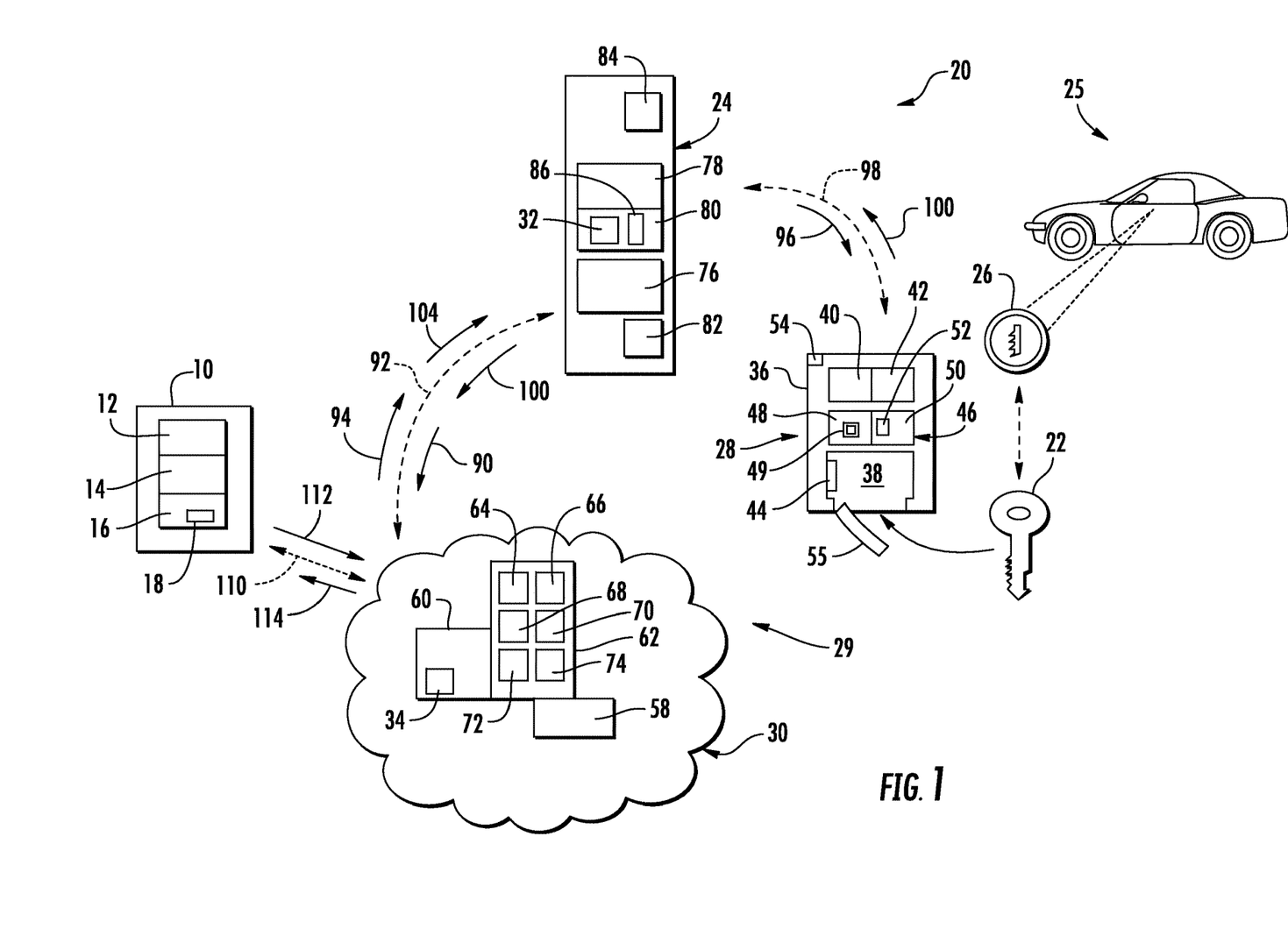
FIG. 1 is a diagram of a system as one, non-limiting, exemplary embodiment of the present disclosure.
Figure 2:
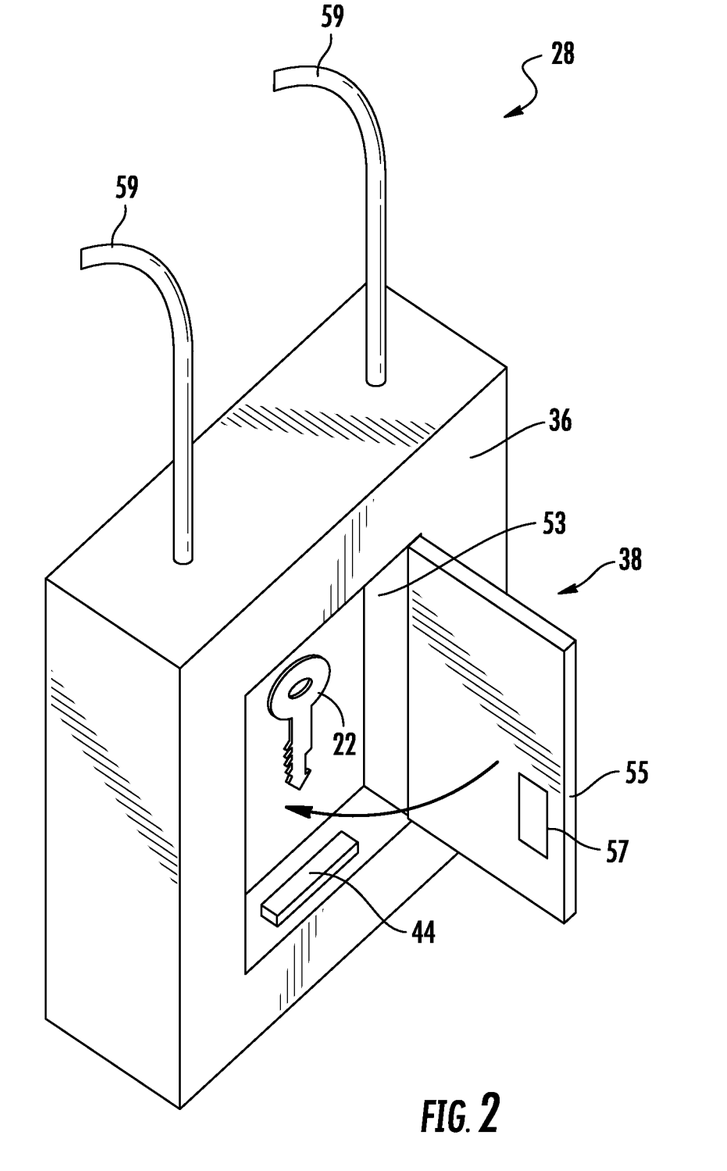
FIG. 2 is a schematic of a vehicle key box according to an embodiment.
Figure 3:
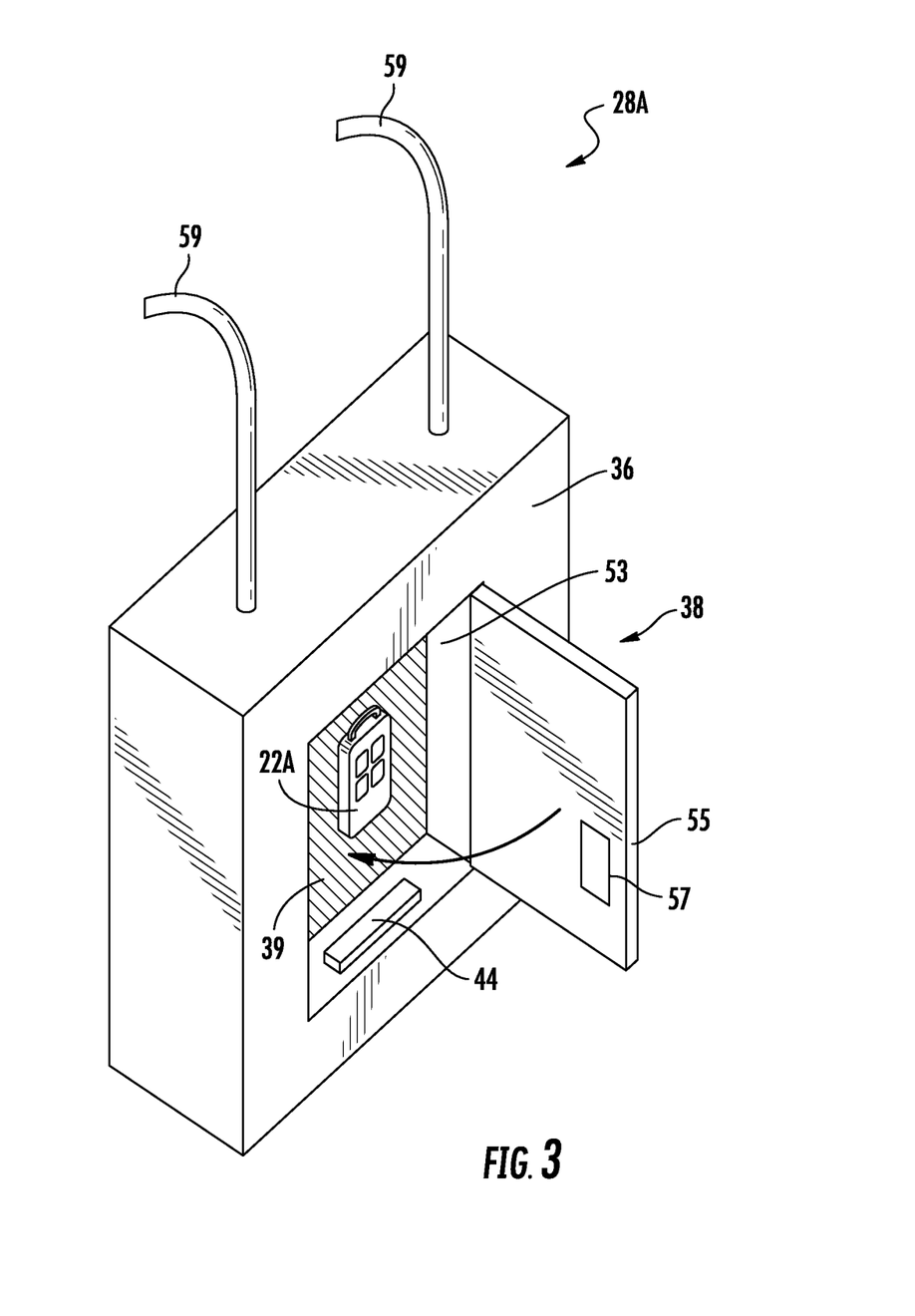
FIG. 3 is a schematic of a vehicle key box according to another embodiment.

Referring to FIGS. 1-3, a vehicle key access control system 20 facilitates the controlled release of a vehicle key 22 upon authentication of a credential from a mobile device 24 that may be carried by a user. Once released, the vehicle key 22 may be used to unlock a vehicle lock 26 of a vehicle 25 that may generally be independent of the vehicle key access control system 20. The vehicle 25 can be any type of conveyance with a lockable interior, such as an automobile, a truck, a boat, an aircraft, and the like. In one example, the vehicle key 22 may be a small piece of shaped metal with incisions cut to fit the wards of the vehicle lock 26. In other examples, the vehicle key 22 may be a radio frequency enabled fob 22A operable to wirelessly communicate with the vehicle 25 to enable unlocking and/or activation/ignition of the vehicle 25. Examples of the mobile device 24 may include a smartphone, a tablet computer, or any other computing devices with wireless communication capability typically carried by a user.

The vehicle key access control system 20 may include at least one vehicle key box 28, a mobile credential management system 29 including at least one server 30 that may be remote and/or cloud-based, and an application 32 that may be software-based and loadable onto the mobile device 24. The vehicle key box 28 may include a casing 36, lockable key repository 38, a receiver 40, a transmitter 42, a key presence device 44, and a controller 46. The controller 46 may include a processor 48 (e.g., microprocessor) and an electronic storage medium 50 that may be computer writeable and readable. The storage medium 50 may store any variety of electronic data including access data or logs, and a credential validation application or module 52 that may be software-based and executable by the processor 48. It is contemplated and understood that the at least one server 30 may be located on-site, for example, in a building or structure proximate to the vehicle key box 28. It is further contemplated that the vehicle key box 28 may be self-contained, having the needed processing capability within the vehicle key box 28 itself, and communicating solely with the mobile device 24 that may possess the required credential. Although depicted with a single server 30, the mobile credential management system 29 can include one or more processing systems 60 that collectively perform the operations as further described herein.

A user system 10 may be operable to interface with the mobile credential management system 29 and can include a user interface 12, a processor 14 (e.g., microprocessor), and an electronic storage medium 16 that may be computer writeable and readable. The storage medium 16 may store an application 18, and the processor 14 may execute the application 18. The application 18 can enable a user, such as a salesperson or other person associated with controlling access to the vehicle 25, to interface with the mobile credential management system 29 through one or more communication interface 110, including sending requests 112 to and receiving data/notification messages 114 from the mobile credential management system 29. There can be multiple instances of the user system 10, for instance, to support multiple salespeople and/or administrators having security permissions to configure aspects of the vehicle key box 28 through the mobile credential management system 29. For example, the user system 10 may control establishing an association or link between vehicle key box 28 and the vehicle 25, confirm scheduled access appointment requests, receive access notifications indicative of the vehicle key box 28 being opened, and access user identified information associated with a user of the mobile device 24 upon credential creation and/or credential use.

With respect to the vehicle key box 28, the lockable key repository 38 may generally include a key compartment 53, an access panel 55, a lockable, or releasable latch 57, and a hanger or attachment means 59. The key compartment 53 may include boundaries defined by the casing 36 and the access panel 55. In embodiments where the vehicle key 22 is embodied as the radio frequency enabled fob 22A, the lockable key repository 38 can be lined with a radio frequency obstructing material 39 that obstructs communication between the radio frequency enabled fob 22A and the vehicle 25 while the access panel 55 is closed (as depicted in vehicle key box 28A of FIG. 3). The radio frequency obstructing material 39 can be a radio frequency absorbing or blocking material that effectively establishes a faraday cage/enclosure around the radio frequency enabled fob 22A. The access panel 55 may be releasably engaged to the casing 36 via the releasable latch 57. Examples of the releasable latch 57 may include any variety of mechanical and/or magnetic devices generally known by those skilled in the art of latches. The engagement and disengagement of the releasable latch 57 may be generally controlled by the controller 46.

In some embodiments, the controller 46 can include a clock 49 that can be used to verify that a credential 96 provided from the mobile device 24 via a wireless communication interface 98 is presently valid based on an assigned window of time. For example, the credential 96 can be an encoded value that includes an identifier specific to the vehicle key box 28 and a valid time range in which the credential 96 can be considered valid for opening the releasable latch 57. As an alternative, the vehicle key box 28 may communicate with a processing system 60 of the mobile credential management system 29, which may use a clock 34 to validate that the credential 96 is being used within an assigned window of time.

Once the vehicle key 22 is removed, the processor 48 of the vehicle key box 28 may, or may not, output a command that re-latches the access panel 55 closed. Upon the return of the vehicle key 22, the key presence device 44 may sense the return of the vehicle key 22 as a key return event resulting in closure/re-latching of the access panel 55 to secure the vehicle key 22. Examples of a key presence device 44 may include a device capable of sensing the weight of the vehicle key 22, a device capable of sensing a close-range signal emitted from the vehicle key 22, a device attached to the vehicle key 22, such as a magnet that could be acknowledged by a sensor in the key box 28, or other such sensing device. Events such as credential validation and acknowledgement can trigger one or more messages 100 to the mobile device 24 and/or to the mobile credential management system 29, which may be further flowed to the user system 10.

In some embodiments, the vehicle key box 28 may be an off-line lock assembly and all communications between the server 30 and the vehicle key box 28 may be conducted through the mobile device 24. The vehicle key box 28 may further communicate with the mobile device 24 by way of Near-Field Communications (NFC) or two-way Bluetooth communications with longer range wireless communications being performed by the mobile device 24. Alternatively, it is contemplated and understood that communications may be conducted directly between one or more server 30 of the mobile credential management system 29 and the vehicle key box 28.

In one example, the vehicle key box 28 may be one of a plurality of lock boxes capable of communicating to and/or through the mobile device 24, via the application 52, and to the mobile credential management system 29. Each vehicle key box 28 may include a key box identifier 54 associated with the vehicle key box 28 and/or the vehicle 25. The key box identifier 54 may be displayed visually on the vehicle key box 28, or may be transmitted (i.e., a beacon) by the transmitter 42 of the vehicle key box 28 for receipt by the mobile device 24.

In one example, the key box identifier 54 may be formatted as a barcode, QR code, or other code fixed to the vehicle key box 28, capable of being scanned, or read, by the mobile device 24. In another example, the key box identifier 54 may be wirelessly communicated to the mobile device 24 and/or the mobile credential management system 29. In yet a third example, the mobile device 24 may identify a vehicle key box 28 based on geographic location through use of a geographic positioning application 86 applied by the mobile device 24.

In one embodiment, the vehicle lock 26, the vehicle key 22, and the vehicle key box 28 may be associated with the same key box identifier 54. In another embodiment, the key box identifier 54 of the vehicle key box 28 may be temporarily associated with the vehicle 25 and the vehicle key 22 that works with the vehicle 25. In this example, the mobile credential management system 29, or the controller 46 of the vehicle key box 28 may be programmed to at least temporarily associate the key box identifier 54 to the vehicle 25 and the vehicle key 22 until removed from inventory, e.g., due to a sale of the vehicle 25.

The server 30 may include a transceiver 58 for wireless communications, processing system 60 (e.g., one or more microprocessors), and a memory system including an electronic storage medium 62 that may be computer writeable and readable. In one embodiment, the server 30 may be configured to correlate the key box identifier 54 of the vehicle key box 28 to a specific site of the vehicle lock 26, which utilizes the vehicle key box 28. More specifically, and in one example, the vehicle key box 28 may be temporarily secured to a window of the vehicle 25 while within the inventory of a vehicle dealership. The vehicle key 22 is the key typically used lock, unlock, and start the vehicle 25.

The electronic storage medium 62 may store any variety of modules that may be software based and executable by the processing system 60. For example, the modules may include a credentialing module 64, a scheduling module 66, a validation module 68, a correlation module 70, a third party alert, or administration, module 72, an access monitor module 74, and other modules. The credentialing module 64 may be configured to issue one or more credential 96 to the mobile device 24. The scheduling module 66 may confirm that conflicting windows of time are not scheduled to different users to access the vehicle 25 at the same time. The validation module 68 may confirm the validity of a credential 96 and may support revocation of the credential responsive to an administrative request through the administration module 72. The correlation module 70 may be used to correlate the key box identifier 54 of the vehicle key box 28 to the vehicle 25 that may be temporarily assigned to the vehicle key box 28. That is, the correlation module 70 may apply a programmable, cross-referencing, data table. The administration module 72 may enable configuration of functions, access to underlying data, and other such capability for administrator access through user system 10. The access monitor module 74 may apply a real-time update of when the vehicle key 22 is being utilized. For example, when the credential 96 is used to open the vehicle key box 28, the access monitor module 68 may notify the mobile credential management system 29, which may notify the user system 10 about the access event along with information associated with a user of a mobile device 24. The access monitor module 74 may also track attempted invalid accesses to the vehicle key box 28. It is contemplated and understood that any number of the modules 64, 66, 68, 70, 72, 74 may be stored and executed by the controller 46 of the vehicle key box 28, or as part of the application 32 of the mobile device 24. It is further contemplated that any number of the modules 64, 66, 68, 70, 72, 74, together, may comprise an executable application (i.e., a computer software product).

The mobile device 24 may include a user interface 76, a processor 78 (e.g., microprocessor), an electronic storage medium 80 that may be computer writeable and readable, a scanning device or camera 82, and a transceiver 84. The storage medium 80 may store the application 32 and the processor 78 may execute the application. The application 32 may be configured to identify the specific vehicle key box 28 that may be amongst a plurality of key boxes. In one example, the mobile device 24 may be configured to visually read the key box identifier 54 as a bar code using the camera 82 of the mobile device 24. In another embodiment, the mobile device 24 may be configured to receive the key box identifier 54 as a wireless signal or short range communication via the transceiver 84. In yet a third example, the application 32 may apply a geographic positioning module 86 of the mobile device 24, at least in-part stored in the storage medium 80 and executed by the processor 78, to generally determine the location of the vehicle 25.

In the embodiment where the key box identifier 54 of the vehicle key box 28 is accessible via short range communication (e.g., a Bluetooth signal), the mobile device 24 may be programmed with compatible software (i.e., the application 32). In one example, the vehicle key box 28, or controller 46, may include a Bluetooth device capable of transmitting the vehicle key box identifier 54. The transceiver (i.e., receiver 40 and transmitter 42) may be of a type to support Bluetooth® communications. Further, the key box identifier 54 may be continually broadcast from the vehicle key box 28, and may be received by the mobile device 24 without the vehicle key box 28 knowing or recognizing that a mobile device 24 is nearby.

In an embodiment that applies the geographic position module 86 of the mobile device 24, the geographic position module 86 may be configured to determine positioning information indicative of a geographical position using one or more positioning systems or protocols of a type well known in the art, such as Global Positioning Systems (GPS), Global Navigation System (GLONASS), Global Navigation Satellite System (GNSS), Galileo, Long Range Navigation (LORAN), National Marine Electronics Association (NMEA), Trimble Standard Interface Protocol (TSIP), DELORME® EARTHMATE®, Rockwell PLGR Protocol, iBeacon®, and SIRF®, to name a few non-limiting examples. It will also be appreciated that the geographic position module 86 may include local, regional, or site-wide systems of a type well known in the art, such as radio frequency identification (RFID), infrared (IR), sensor networks, Wi-Fi-based positioning, and Ultra-Wideband (UWB) positioning systems, to name a few non-limiting examples. The geographic position module 86 may work in conjunction with the application 52 of the vehicle key box 28. The geographic position module 86 may be a Global Positioning System (GPS) receiver circuit, or circuitry associated with other satellite navigation systems. In any case, the module 86 and application 52 function to determine the position of the mobile device 24 relative to a known placement of the vehicle key box 28. It will also be appreciated that the positioning information may include types well known in the arts such as, geographic latitude and longitude, Universal Transverse Mercator (UTM) and Universal Polar Stereographic (UPS) coordinates, stereographic coordinates, geodetic height, Cartesian coordinates, and site address, to name a few non-limiting examples.

Operation of the vehicle key access control system 20 will now be described using the example application of a vehicle dealership, wherein each vehicle 25 available for sale may have a respective vehicle key box 28. The correlation module 70 may be used to preprogram each vehicle key box 28 to a particular instance of a vehicle 25 at a known location, e.g., a dealership lot address. Each vehicle 25 may also be assigned to a particular location, such as a parking space identifier. A user of the mobile device 24 may request to view and access the vehicle 25 via the application 32. Alternatively, initial scheduling can be performed through the credentialing module 64 or scheduling module 66, and the application 32 can be provided to the mobile device 24 responsive to a scheduling request. The mobile device 24 may then send a request signal (see arrow 90) over a communication interface 92 to the server 30. The server 30 may then apply the scheduling module 66 to make appropriate inquires of the user and confirm the user's request and/or availability of the vehicle 25. Once confirmed, the server 30 may apply the credentialing module 64 to determine and assign a credential 96 operable to open the releasable latch 57 at an assigned window of time. Once assigned, the server 30 may apply the validation module 68 to output a signal (see arrow 94) that contains information about the vehicle 25 and validation information that provides the mobile device 24 with the necessary code or permission to communicate with, and operate, the vehicle key box 28. As one example, additional details associated with the vehicle 25 may not be directly accessible by the mobile device 24 until credential validation is complete, such as a precise parking location of the vehicle 25 on a dealership lot.

When the mobile device 24 is proximate to the vehicle key box 28, the mobile device 24 may output a retrieve key signal over a communication interface 98 to the vehicle key box 28. The retrieve key signal may contain the credential 96 with assigned validation information initially provided by the server 30. The validation application 52 of the vehicle key box 28 may validate the user, then unlatch the key repository 38.

The user of the mobile device 24 may then remove the vehicle key 22 from the vehicle key box 28. Upon removal, or upon unlatching of the key repository 38, a releasable latch opened indicator may be sent from the vehicle key box 28 indicative of the vehicle key box 28 acknowledging the credential 96 and providing access to the vehicle key 22. The server 30 can receive the releasable latch opened indicator as one of the messages 100 and in response thereto, send a notification to user system 10 that identifies the vehicle 25 and information about a user of the mobile device 24. For instance, a salesperson can monitor the user system 10 and may go and meet the user of the mobile device 24 at the vehicle responsive to the notification. The information about the user of the mobile device 24 can include the user's name, a history of other viewed vehicles, a list of future scheduled vehicles for viewing, and optionally, a photo of the user. Further information about the user of the mobile device 24 can be provided to prefill forms and initiate credit checks, driver history checks, and other such actions as agreed to by the user.

The user of the mobile device 24 can apply the vehicle key 22 to the vehicle lock 26 to unlock the vehicle 25 prior to arrival of a representative/salesperson. When the user of the mobile device 24 returns the vehicle key 22 to the key repository 38, the key presence device 44 may detect the return of the vehicle key 22. Upon return of the vehicle key 22, the processor 48 of the vehicle key box 28 may generate a notification in a message 100 that is sent to the server 30 via the mobile device 24. The server 30 may then relay the event to the user system 10. An acknowledgement of the key return may be sent from the server 30 to the mobile device 24 as a message 104, and the acknowledgement can be displayed on the user interface 76. Yet further, the administration module 72 may be applied by the server 30 upon user departure to arrange an inspection of the vehicle 25 or to schedule a follow-up contact with the user of the mobile device 24.

Figure 4:
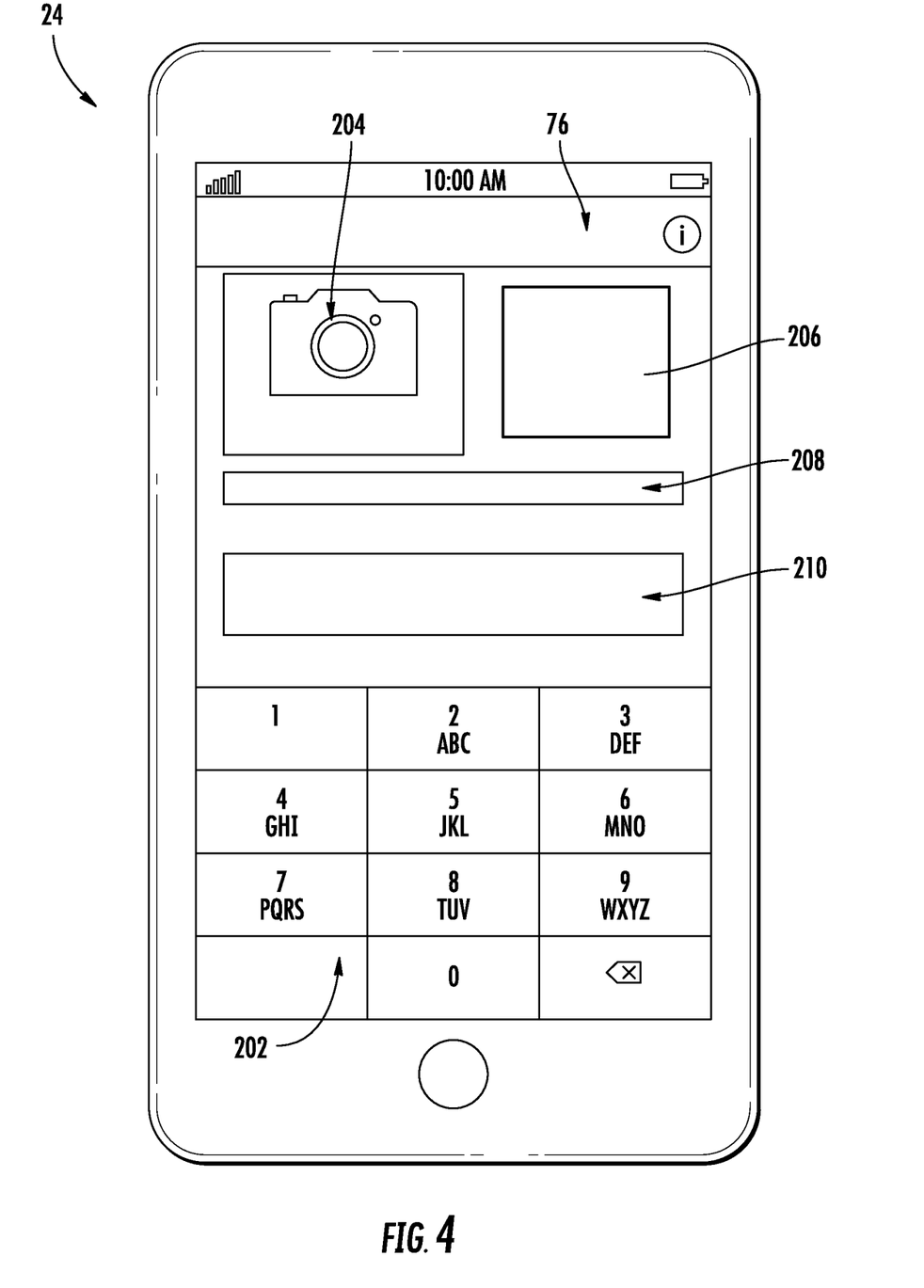
FIG. 4 is a diagram of a user interface of a mobile device according to an embodiment.

FIG. 4 depicts an example of the user interface 76 of the mobile device 24 and is described with further reference to FIG. 1. When a user of the mobile device 24 requests the credential 96 to access the vehicle 25 during an assigned window of time, user inputs 202 can be used to scroll through or search from multiple vehicles until a desired vehicle (vehicle 25) for in-person viewing is identified. The user interface 76 can display one or more images 204 associated with the vehicle 25 along with information 206 such as a specific location of the vehicle 25. The user interface 76 may also display contact information 208 to speak with or message with a user of user system 10 about the vehicle 25. Credential information 210 can be displayed upon receiving the credential 96, which may include the assigned window of time and any codes to assist in finding/accessing the vehicle key box 28.

Figure 5:
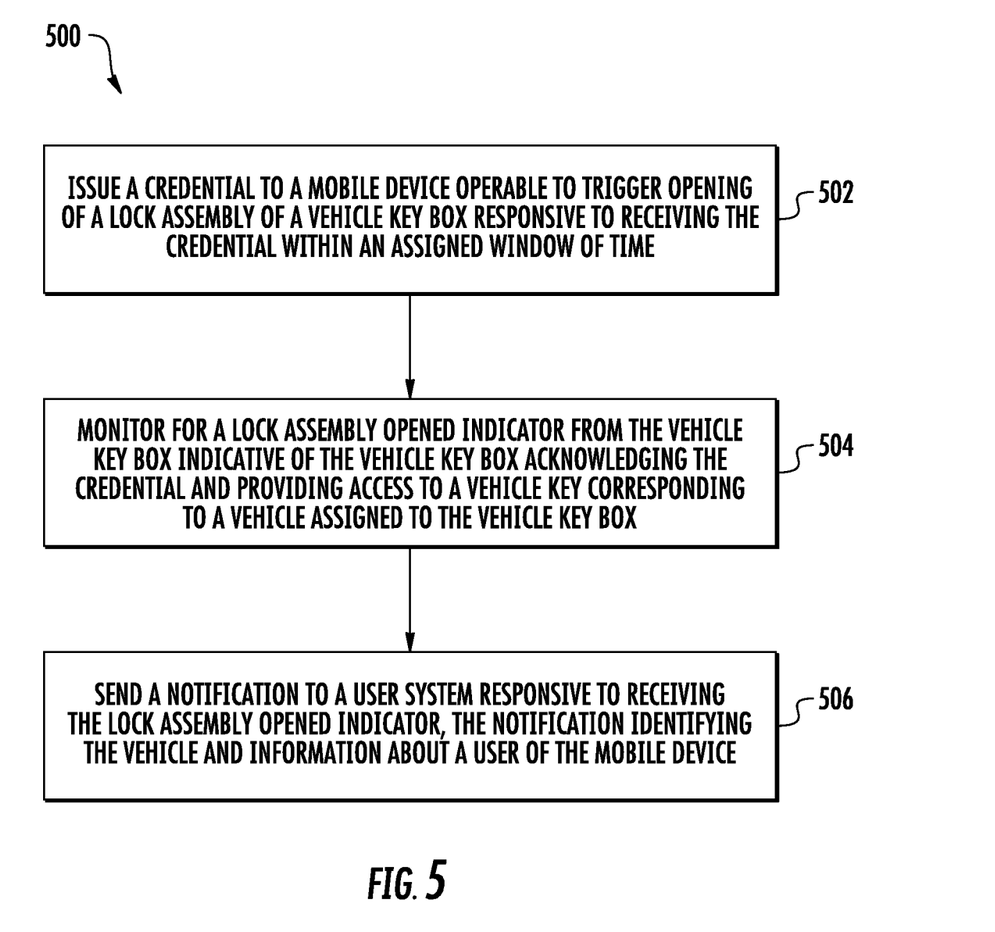
FIG. 5 is a process flow diagram of a method according to an embodiment.

FIG. 5 shows a process flow of a method 500 of mobile credential management, in accordance with an embodiment of the disclosure. The method 500 is described in reference to FIGS. 1-5 and can include additional steps beyond those depicted in FIG. 5.

At block 502, the mobile credential management system 29 issues a credential 96 to a mobile device 24 operable to trigger opening of a releasable latch 57 of a vehicle key box 28 responsive to receiving the credential 96 within an assigned window of time. The credential 96 can be issued in response to a scheduling request identifying the vehicle 25 and the assigned window of time. A verification message can be sent to the mobile device 24 with a link to access the credential 96 responsive to the scheduling request. The link may be displayed as a hyperlink on the user interface 76 (e.g., as part of credential information 210). The credential 96 can be transferred to the mobile device 24 responsive to activation of the link.

At block 504, the mobile credential management system 29 monitors for a releasable latch opened indicator from the vehicle key box 28 indicative of the vehicle key box 28 acknowledging the credential 96 and providing access to a vehicle key 22 corresponding to a vehicle 25 assigned to the vehicle key box 28. If the credential 96 is not used during the assigned window of time, access to open the releasable latch 57 of the vehicle key box 28 using the credential 96 can be disabled after the assigned window of time.

At block 506, the mobile credential management system 29 sends a notification to a user system 10 responsive to receiving the releasable latch opened indicator, where the notification identifies the vehicle 25 and information about a user of the mobile device 24. Information about the user of the mobile device 24 can be gathered during creation of a scheduling request and an identifier of the user linked to the credential 96, for instance, by the credentialing module 64. If needed, the credential 96 can be revoked responsive to an administrative request prior to opening of the releasable latch 57 using the credential 96 (e.g., by administration module 72 in case of suspicious activity).

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A mobile credential management system comprising:
a processing system; and
a memory system comprising computer-executable instructions that, when executed by the processing system, cause the processing system to perform a plurality of operations, the operations comprising:
issuing a credential to a mobile device of a user, the mobile device comprising a computing device operable to trigger opening of a releasable latch of a vehicle key box responsive to a controller of the vehicle key box wirelessly receiving the credential from the mobile device within an assigned window of time;
monitoring for a releasable latch opened indicator from the vehicle key box indicative of the vehicle key box acknowledging validation of the credential from the mobile device within the assigned window of time and providing access to a vehicle key corresponding to a vehicle assigned to the vehicle key box; and
sending a notification to a user system responsive to receiving the releasable latch opened indicator, the notification identifying the vehicle and information about the user of the mobile device.

2. The mobile credential management system set forth in claim 1, wherein the credential is issued in response to a scheduling request identifying the vehicle and the assigned window of time as a future scheduled vehicle viewing.

3. The mobile credential management system set forth in claim 2, wherein the operations further comprise:
sending a verification message with a link to access the credential responsive to the scheduling request.

4. The mobile credential management system set forth in claim 3, wherein the operations further comprise:
  transferring the credential to the mobile device responsive to activation of the link.

5. The mobile credential management system set forth in claim 1, wherein the operations further comprise:
  disabling access to open the releasable latch of the vehicle key box using the credential after the assigned window of time.

6. The mobile credential management system set forth in claim 1, wherein the operations further comprise:
  gathering the information about the user of the mobile device during creation of a scheduling request; and
  linking an identifier of the user to the credential.

7. The mobile credential management system set forth in claim 1, wherein the operations further comprise:
  revoking the credential responsive to an administrative request prior to opening of the releasable latch using the credential.

8. A vehicle key access control system comprising:
  a vehicle key box comprising:
    a lockable key repository configured to hold a vehicle key corresponding to a vehicle assigned to the vehicle key box;
    an access panel with a releasable latch; and
    a controller operable to unlock the releasable latch responsive to wirelessly receiving and validating a credential from a mobile device of a user within an assigned window of time and output a releasable latch opened indicator acknowledging the credential, wherein the mobile device comprises a computing device; and
  a mobile credential management system comprising a processing system operable to:
    issue the credential to the mobile device;
    monitor for the releasable latch opened indicator indicative of the vehicle key box acknowledging validation of the credential from the mobile device within the assigned window of time; and
    send a notification to a user system responsive to receiving the releasable latch opened indicator, the notification identifying the vehicle and information about the user of the mobile device.

9. The vehicle key access control system set forth in claim 8, wherein the lockable key repository includes a key presence device adapted to detect return of the vehicle key, and the controller is operable to notify the user system of a key return event responsive to the key presence device.

10. The vehicle key access control system set forth in claim 8, wherein the lockable key repository is lined with a radio frequency obstructing material.

11. The vehicle key access control system set forth in claim 8, wherein the credential is issued in response to a scheduling request identifying the vehicle and the assigned window of time as a future scheduled vehicle viewing, and the processing system is operable to send a verification message with a link to access the credential responsive to the scheduling request and transfer the credential to the mobile device responsive to activation of the link.

12. The vehicle key access control system set forth in claim 8, wherein use of the credential is disabled after the assigned window of time.

13. The vehicle key access control system set forth in claim 8, wherein the processing system is operable to gather the information about the user of the mobile device during creation of a scheduling request and link an identifier of the user to the credential.

14. The vehicle key access control system set forth in claim 8, wherein the credential is revoked responsive to an administrative request prior to opening of the releasable latch using the credential.

15. A method comprising:
  issuing, by a mobile credential management system, a credential to a mobile device of a user, the mobile device comprising a computing device operable to trigger opening of a releasable latch of a vehicle key box responsive to a controller of the vehicle key box wirelessly receiving the credential from the mobile device within an assigned window of time;
  monitoring, by the mobile credential management system, for a releasable latch opened indicator from the vehicle key box indicative of the vehicle key box acknowledging validation of the credential from the mobile device within the assigned window of time and providing access to a vehicle key corresponding to a vehicle assigned to the vehicle key box; and
  sending, by the mobile credential management system, a notification to a user system responsive to receiving the releasable latch opened indicator, the notification identifying the vehicle and information about the user of the mobile device.

16. The method set forth in claim 15, wherein the credential is issued in response to a scheduling request identifying the vehicle and the assigned window of time as a future scheduled vehicle viewing, and the method further comprises:
  sending a verification message with a link to access the credential responsive to the scheduling request.

17. The method set forth in claim 16, further comprising:
  transferring the credential to the mobile device responsive to activation of the link.

18. The method set forth in claim 15, further comprising:
  disabling access to open the releasable latch of the vehicle key box using the credential after the assigned window of time.

19. The method set forth in claim 15, further comprising:
  gathering the information about the user of the mobile device during creation of a scheduling request; and
  linking an identifier of the user to the credential.

20. The method set forth in claim 15, further comprising:
  revoking the credential responsive to an administrative request prior to opening of the releasable latch using the credential.

* * * * *